United States Patent
Grittke et al.

(10) Patent No.: US 8,812,262 B2
(45) Date of Patent: Aug. 19, 2014

(54) FIELD DEVICE FOR DETERMINING OR MONITORING A PROCESS VARIABLE IN PROCESS AUTOMATION

(75) Inventors: Udo Grittke, Steinen (DE); Dietmar Fruhauf, Lorrach (DE); Axel Humpert, Reinau (DE); Romuald Girardey, Huningue (FR)

(73) Assignee: Endress + Hauser GmbH + Co. KG, Maulburg (DE)

( * ) Notice: Subject to any disclaimer, the term of this patent is extended or adjusted under 35 U.S.C. 154(b) by 1113 days.

(21) Appl. No.: 12/734,558

(22) PCT Filed: Nov. 12, 2008

(86) PCT No.: PCT/EP2008/065382
§ 371 (c)(1),
(2), (4) Date: Apr. 5, 2011

(87) PCT Pub. No.: WO2009/062954
PCT Pub. Date: May 22, 2009

(65) Prior Publication Data
US 2011/0191062 A1    Aug. 4, 2011

(30) Foreign Application Priority Data
Nov. 14, 2007   (DE) .................. 10 2007 054 672

(51) Int. Cl.
*G06F 11/30*  (2006.01)
*H03K 19/003*  (2006.01)

(52) U.S. Cl.
USPC .......................................... 702/182; 326/11

(58) Field of Classification Search
USPC ............. 702/182, 81, 84, 108, 117–119, 127, 702/183, 186, 188; 326/10–11, 14, 41; 700/6, 9, 11
See application file for complete search history.

(56) References Cited

U.S. PATENT DOCUMENTS

| | | |
|---|---|---|
| 5,757,641 A | 5/1998 | Minto |
| 7,111,213 B1 * | 9/2006 | Dastidar et al. ............... 714/724 |

(Continued)

FOREIGN PATENT DOCUMENTS

| | | |
|---|---|---|
| DE | 200 10 739 U1 | 6/2001 |
| DE | 100 25 085 A1 | 12/2001 |

(Continued)

OTHER PUBLICATIONS

Paulsson et al., Methods for Run-Time Failure Recognition and Recovery in Dynamic and Partial Reconfigurable Systems Based on Xilinx Virtex-II Pro FPGAs, Mar. 2-3, 2006, Proceedings of the 2006 Emerging VLSI Technologies and Architectures, 6 pp.*

(Continued)

*Primary Examiner* — Toan Le
(74) *Attorney, Agent, or Firm* — Bacon & Thomas, PLLC

(57) ABSTRACT

A field device for determining or monitoring a process variable in process automation. The field device includes: sensor, which works according to a defined measuring principle; and a control/evaluation unit, which conditions and evaluates measurement data delivered by the sensor along at least two equal valued measuring paths as a function of a safety standard required in a particular safety-critical application. The control/evaluation unit is embodied, at least partly, as a reconfigurable logic chip, with a plurality of partially dynamically reconfigurable, function modules. The control/evaluation unit so configures the function modules in the measuring paths as a function of the defined safety-critical application, that the field device is correspondingly designed to the required safety standard.

15 Claims, 8 Drawing Sheets

(56) References Cited

U.S. PATENT DOCUMENTS

| | | | |
|---|---|---|---|
| 7,124,041 B1 | 10/2006 | Johnson | |
| 7,389,460 B1 * | 6/2008 | Demara | 714/733 |
| 2007/0152709 A1 | 7/2007 | Gerhart | |
| 2007/0198106 A1 * | 8/2007 | Schuster et al. | 700/79 |

FOREIGN PATENT DOCUMENTS

| | | |
|---|---|---|
| DE | 10 2005 044 385 A1 | 4/2006 |
| DE | 10 2007 001 576 A1 | 9/2007 |
| DE | 10 2006 047 262 A1 | 4/2008 |
| DE | 10 2007 054 672 A1 | 5/2009 |
| WO | WO 00/36492 | 6/2000 |
| WO | WO 2004/013585 A1 | 2/2004 |
| WO | WO 2008/046696 A2 | 4/2008 |

OTHER PUBLICATIONS

Abstract of Paulsson et al. Reference, Mar. 2-3, 2006, Proceedings of the 2006 Emerging VLSI Technologies and Architectures, 2 pp.*

* cited by examiner

FIELD DEVICE FOR DETERMINING OR MONITORING A PROCESS VARIABLE IN PROCESS AUTOMATION

TECHNICAL FIELD

The invention concerns a field device for determining or monitoring a process variable in process automation. The field device includes a sensor, which works on a defined measuring principle, and a control/evaluation unit, which conditions and evaluates measurement data delivered by the sensor. The control/evaluation unit conditions and evaluates the measurement data along at least two equal valued, redundant and for diverse, measuring paths as a function of a safety standard required in the particular safety-critical application. A corresponding solution is known from published International Application WO 2004/013585 A1.

BACKGROUND DISCUSSION

In automation technology, especially in process automation technology, field devices are applied that serve for determining and monitoring process variables. Examples for such field devices are fill-level measuring devices, flow measuring devices, analytical measuring devices, pressure, and temperature, measuring devices, moisture, and conductivity, measuring devices, and density, and viscosity, measuring devices. The sensors of these field devices measuring device the corresponding process variables, e.g. fill level, flow, pH-value, substance concentration, pressure, temperature, moisture, the conductivity, density and viscosity.

The terminology 'field devices' includes, however, also actuators, e.g. valves or pumps, by which, for example, the flow of a liquid in a pipeline or the fill level in a container is changeable. A large number of such field devices are available from members of the firm, Endress+Hauser.

As a rule, field devices in modern automation technology plants are connected via communication networks, such as HART-multidrop, point to point connection, Profibus, Foundation Fieldbus, with a superordinated unit, which is referred to as control systems or control room. This superordinated unit serves for process control, process visualizing, process monitoring as well as for start-up and for servicing the field devices. For the operation of fieldbus systems, necessary supplemental components, which are directly connected to a fieldbus, and which are especially used for communication with the superordinated units, are likewise frequently referred to as field devices. These supplemental components include e.g. remote I/Os, gateways, linking devices or controllers.

The software portion of field devices is increasing increases steadily. The advantage of using microcontroller controlled field devices is that, via application-specific software programs, a variety of functionalities can be implemented in a field device; also program changes are relatively simple to perform. Standing in contrast to the high flexibility of the program controlled field device is a relatively low processing speed and therefore a correspondingly low measuring rate. This is a consequence of the sequential progression through the program.

In order to increase the processing speed, ASICs—Application Specific Integrated Circuits—are always applied when sensible in the field devices. Through their application-specific configuration, these chips can process data and signals substantially faster than a software program can. ASICs are excellently suited for computationally intensive applications.

Disadvantageous in the case of the application of ASICs is that the functionality of these chips is predetermined. In such case, subsequent change of the functionality is not directly possible. Furthermore, the use of ASICs is useful only in the case of relatively large lots, since the developmental effort and the associated costs are high.

In order to avoid this drawback of the fixedly predetermined functionality, a configurable field device is known from published International Application WO 03/098154, in which a reconfigurable logic chip in the form of a FPGA is provided. In the case of this known solution, during system start, the logic chip is configured with at least one microcontroller, also called an embedded controller. After the configuration is finished, the required software is loaded in the microcontroller. The required reconfigurable logic chip must make use of sufficient resources, namely logic, wiring and memory resources, in order to fulfill the desired functionalities. Logic chips with many resources require a lot of energy, which, in turn, from a functional point of view, makes their use in the process automation possible without limitation. The disadvantage of using logic chips with few resources and, thus, with less energy consumption is the considerable limitation in the functionality of the corresponding field device.

Depending on the application, the field devices must satisfy a variety of safety requirements. In order to satisfy the respective safety requirements, e.g. the SIL standard, 'security integrity level', the field devices must be designed with redundancy and/or diversity.

Redundancy means increased safety through double or multiple layouts of all relevant safety hardware and software-components. Diversity means that the hardware components, such as a microprocessor, which are located in the different measuring paths, come from different manufacturers and/or that they are of different types. In the case of software-components, the diversity requires that the software stored in the microprocessors originates from different sources, e.g. from different manufacturers or programmers. Through all these measures, it should be assured that a safety critical failure of the measuring device, as well as the occurrence of concurrent systematic errors in the providing of measured values, is excluded with a high degree of certainty. It is also known supplementally to design individual essential hardware, and software, components of the evaluating circuit redundantly and/or diversely. Through the redundant and diverse design of individual hardware, and software, components, the degree of safety can be still further increased.

An example of a safety-relevant application is fill-level monitoring in a tank, in which a flammable liquid is stored, or a liquid that is not flammable, but water endangering. This assures that the supply of liquid to the tank is immediately interrupted, as soon as a maximum allowable fill level is reached. This in turn implies that the measuring device very reliably detects the fill level and works faultlessly.

SUMMARY OF THE INVENTION

The object of the invention is to provide a field device which can be adapted easily and with high flexibility to a required safety standard.

The object is achieved by the features that the control/evaluation unit is formed at least partially as a reconfigurable logic chip with multiple partially dynamically reconfigurable function modules and that the control/evaluation unit so configures the function modules in the measuring paths as a function of a defined safety-critical application, that the field device is designed to correspond with the required safety standard.

One large advantage of the solution of this invention is that the field device can be adapted easily and with high flexibility to the required safety standard, taking into account the required safety norms. A failure of at least one safety relevant component does not inevitably lead to total failure of the entire field device.

As per a preferred embodiment of the field device of the invention, it is provided that the measuring paths are designed with the partially dynamically reconfigurable function modules, redundantly or diversely, or both redundantly and diversely. In individual cases, the design depends on the specific security standard, e.g. according to SIL1, SIL2, SIL3. The safety standard requires, for example, a redundant and a diverse design of the hardware and the software-components. This means that the redundant components from different manufacturers are used. Thus, systematic malfunctions of the components can be avoided with high probability. In the case of software, diverse means that programs from different programming firms, or different programmers, are used. Thus, with a probability bordering on certainty, the elimination of systematic errors will be achieved.

In an advantageous embodiment of the device, it is provided that the control/evaluation unit is associated with a voter. The voter compares corresponding data made available by, from or in the different measurement paths, and, in case of discrepancy, generates a warning or error message. In the simplest case, the voter is based on decision logic. Of course, a microcontroller can also be used here. The microcontroller is preferably configured permanently on the FPGA.

Moreover, in connection with the solution of the invention, it is provided that the control/evaluation unit partially dynamically reconfigures the function modules in series or in parallel for an uneven number of redundant and/or diverse measuring paths, wherein the control/evaluation unit or the voter compares the data that were made available in, by or from the measuring paths, and wherein the control/evaluation unit generates a warning message that a defined measuring path is delivering defective data, when data made available on the defined measuring path differ from the data of the remaining measuring paths.

Preferably, the control/evaluation unit reconfigures the individual function modules or the groups of function modules that are arranged in a measuring path partially dynamically in a defined first region of the logic chip. Furthermore, a microcontroller is provided, which, by comparing the data of individual function modules or groups of function modules with the data of corresponding redundant or diverse function modules or groups of function modules, ascertains whether the function module or the group of functional modules in the first area of the logic module is working correctly or is malfunctioning. This test can also occur by means of a test signal. A corresponding method is described in the non-prepublished German Patent application DE 10 2006 047 262.4. The content of this application is incorporated herein by reference.

In a further development of the field device, it is provided that, in the case of an ascertained error, the control/evaluation unit newly reconfigures the defective function module, or the defective group of function modules, anew in the first region, and compares the corresponding data with one another. If an error occurs again, then the control/evaluation unit reconfigures a diverse function module or a group of diverse function modules in the corresponding first region of the logic chip.

In the case of the repeated occurrence of an error, the control/evaluation unit subsequently blocks the first region of the logic chip and reconfigures the corresponding function module, or the corresponding group of function modules, in a second region of the logic chip that differs from the first region. In turn, the corresponding data are compared with one another.

If an error message is still generated, the control/evaluation unit reports that the function module, or the group of function modules, is malfunctioning, and the control/evaluation unit reconfigures a redundant and/or diverse function block in the second region.

As already mentioned above, the control/evaluation unit reconfigures hardware, and/or software, based function modules in each of the measuring paths.

A preferred embodiment of the field device of the invention provides that an analog sensor circuit is associated with the sensor for outputting a raw measurement signal, which represents the process variable which is to be ascertained or to be monitored. The control/evaluation unit includes especially the following function modules:

An analog/digital converter, which converts the analog, raw measurement signal into a digital, raw measurement signal;

a processing unit that serves for redundant and/or diverse analysis of the digital, raw measurement signal; and, in given cases, a communication circuit, which serves for forwarding the evaluated measurement signal to a superordinated unit.

Moreover, it is provided that the raw measurement signal is supplied supplementally to the voter. On the basis of a comparison of the actual data of the raw measurement signal with correspondingly stored, desired data, it is ascertained whether the sensor works correctly or is malfunctioning.

As already mentioned, it is advantageous, when a test microprocessor is provided, which sends a test signal or a test pattern to a function module or a group of function modules and checks the functioning of the function module or the functioning of the group of function modules through a comparison of the actual response data to the test signal or the test pattern with corresponding, stored, desired response data. More information about this can be found in the previously mentioned DE 10 2006 047 262.4.

Preferably, beside the dynamic region, a static region is provided, in which at least one function module, e.g. a control unit, in which the control program for configuring the function modules is running, is permanently configured.

As already mentioned, the logic chip is a dynamically partially reconfigurable FPGA. Further information on the partially dynamically reconfigurable FPGA can be found in the non-prepublished PCT/EP2007/059440, which, among other things, claims the priority of the similarly non-prepublished DE 10 2006 049 509.82 of Oct. 17, 2007.

Alternatively, it is provided that the logic chip involves a plurality of logic cells in a fixedly wired FPGA/standard ASIC structure, wherein the logic cells are so configurable by means of configuration registers, that they execute elementary logic functions. Furthermore, a connection matrix with a plurality of memory cells is provided, in which the different logical connections of the logic cells are configurable in defined complex connections by means of the configuration register. Furthermore, a control unit is provided which partially dynamically so configures the logic cells and the connection matrix via an internal bus and via the configuration register by means of a configuration, bit stream, that the fixedly wired FPGA/ASIC structure behaves functionally as a partially dynamically reconfigurable standard logic chip. Further information about this FPGA/ASIC structure can be found in the non-prepublished International Patent Application PCT/EP2007/059442, which, among other things, claims the priority of the similarly non-prepublished International Patent Application DE 10 2006 049 509.82 of Oct. 17, 2007.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
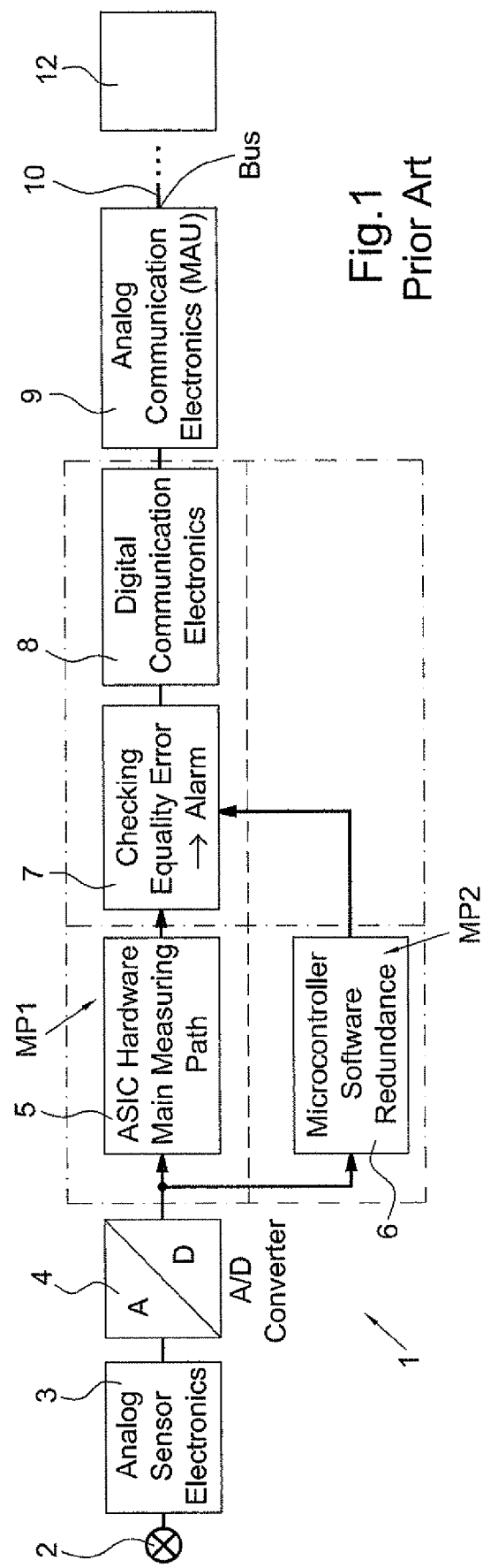
FIG. 1 is a block diagram of a state of the art redundantly/diversely embodied pressure measuring device, which corresponds to a predetermined safety standard.

FIG. 1 shows a block diagram of a redundantly/diversely embodied pressure measuring device known from the state of the art. In the case of field devices 1, which are applied in safety-critical applications and which are classified according to SIL (safety integrity level), an independent checking of the respective measurement results is required. Until now, two or more different measuring paths MP1, MP2 were provided in field device 1 for this. Frequently, in such a case, the measured value is ascertained by hardware in a first measuring path MP1 with the assistance of an ASIC 5. Additionally, the measured value is again ascertained, this time by software, in a second measuring path MP2 with a program which is running in a microcontroller 6. The diverse measured value ascertained with the microcontroller 6 is compared with the measured value ascertained by the ASIC 5. If the two measured values are equal within a predetermined error tolerance—a corresponding review occurs in the voter 7—, it can be assumed that the field device 1 is working without problem. A deviation is always taken as an indication of a malfunction. In the case of an inequality of the two measured values, an alarm is then produced, which is forwarded via a digital communication electronics 8, an analog communication electronics 9 and a bus system 10 to a superordinated control unit or control room 12. A corresponding field device 1 for pressure measurement is available from the assignee under the designation, Cerabar S Evolution.

Figure 2:
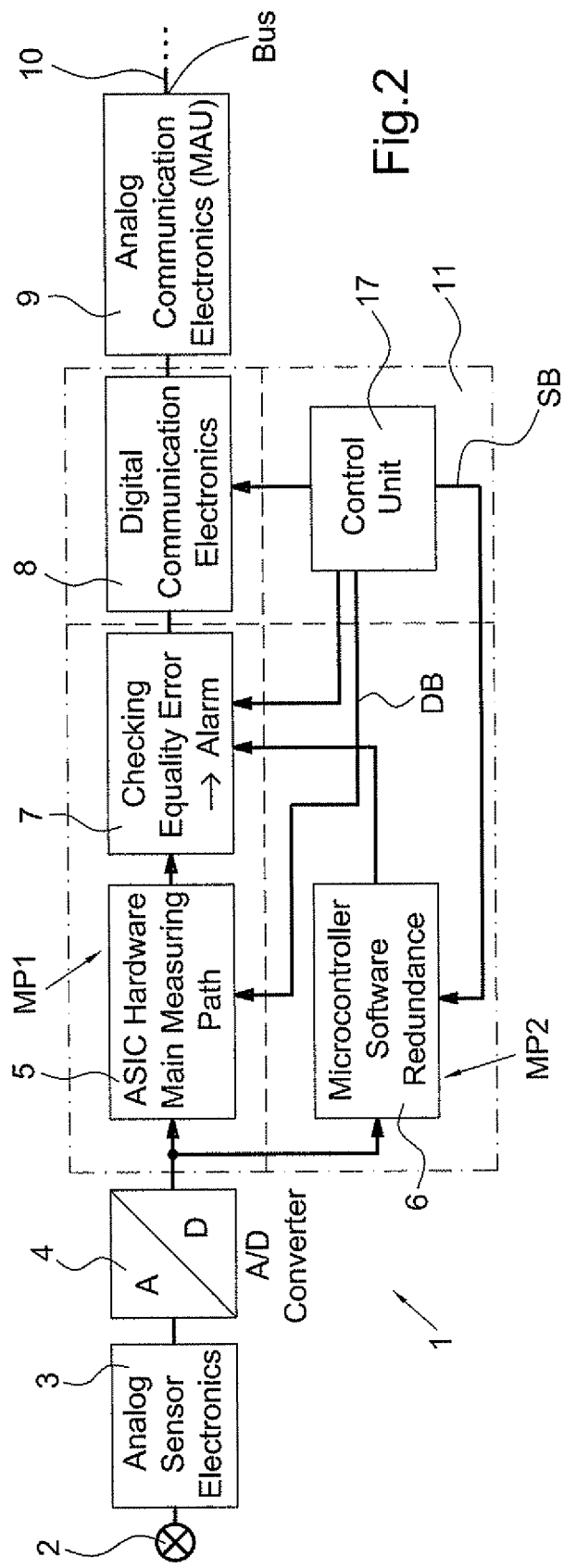
FIG. 2 is a block circuit diagram of a partially dynamically reconfigurable pressure measuring device of the invention, which corresponds to a predetermined safety standard.

The field device 1 shown in FIG. 1 is embodied in FIG. 2 as a solution of the invention with a partially dynamically reconfigurable logic chip 11. The field device 1 operates according to a SIL standard is defined in the respective application.

According to the invention, in the partially dynamically reconfigurable region of the FPGA 11, the corresponding diverse function modules 5, 6 are configured either in series or in parallel. In this way, the evaluation unit enables preparation of a non-SIL capable field device for SIL operation. Because, displaced in time, hardware or software function modules 5, 6 can be configured one after the other on the same surface, the memory requirement is correspondingly small in comparison to currently known solutions. Besides the temporary removal of individual function modules 5, 6, 7, 8 and their replacement by other function modules 5', 6', 7', 8', it is also possible to temporarily reduce the area of individual function modules 5, 6, 7, 8, wherein the reduced area ultimately depends on the specific application of the field device 1.

Partially dynamically reconfigurable logic chips 11 offer different alternatives for the measuring paths MP1, MP2, MP3 needed for SIL operation. In FIG. 2, the alternative, hardware 5/software 6, is presented. Of course, the alternative, hardware 5/hardware 5', or software 6/software 6', can also be used. In the case of all alternatives with two equal valued measuring paths MP1, MP2—hardware 5/hardware 5', or software 6/software 6'—the two groups of function modules can be embodied both redundantly as well as also diversely. Individual examples are described in detail in the following figures.

Figure 3A:
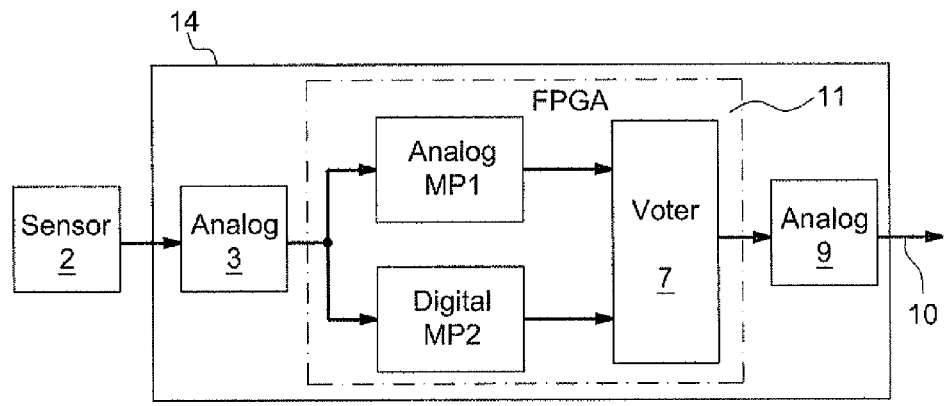
FIG. 3a is a first diversely analogy/digitally embodied control unit of the invention for safety-critical applications.
Figure 3B:
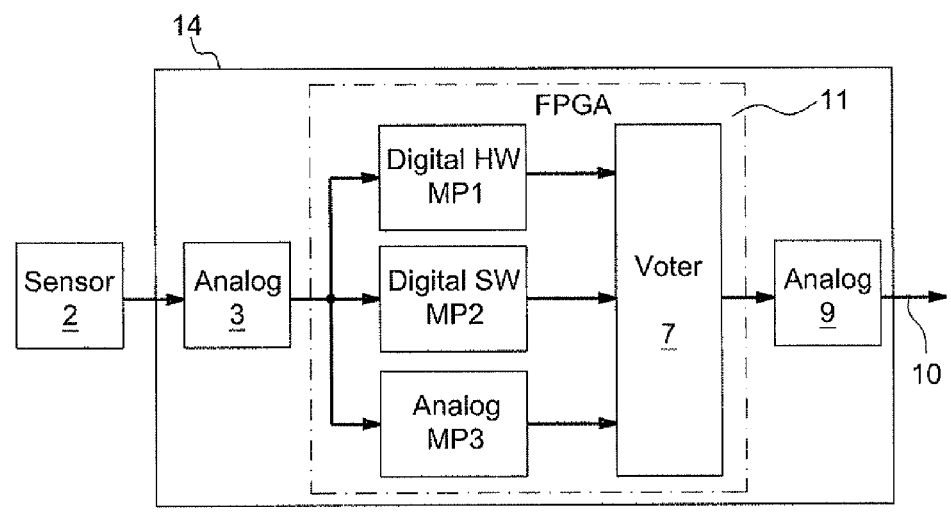
FIG. 3b is a second diversely analogy/digitally embodied control unit of the invention for safety-critical applications.

FIGS. 3a and 3b show two different, diverse, analogy/digitally embodied control/evaluating units 14 for safety-critical applications. While the embodiment shown in FIG. 3A is doubly diverse, the embodiment shown in FIG. 3b is embodied with triple diversity. The embodiment suited for the particular application is reconfigured, according to the invention, partially dynamically on the FPGA 11. While in the case of the embodiment illustrated in FIG. 3A, the analog sensor electronics 3 and the analog communication electronics 9 are reconfigured partially dynamically on the FPGA 11 in accordance with the required safety-critical applications, they are reconfigured in the embodiment shown in FIG. 3b in two FPAA regions 15. If there is a deviation between the measurement results in the different measuring paths MP1, MP2, or MP1, MP2, MP3, then this is output to the control room 12 or to the operating personnel in the form of a warning or error message via the data line, which is preferably a data bus 10.

Figure 4A:
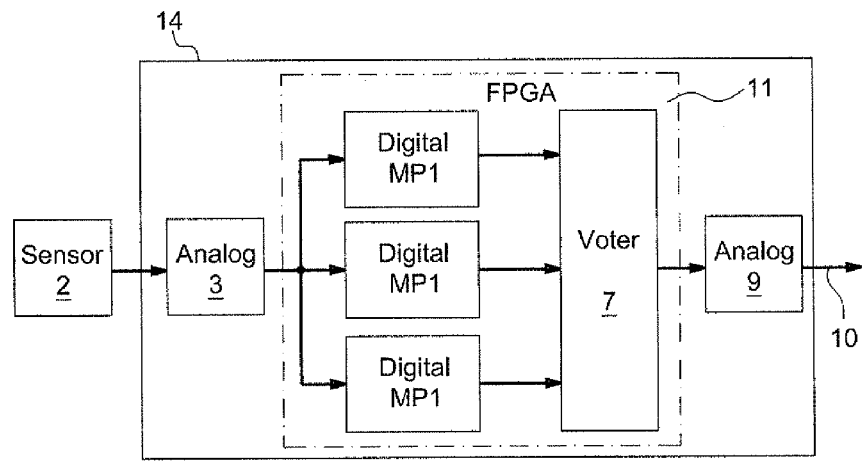
FIG. 4a is a third control/evaluation unit of the invention with triple redundance.
Figure 4B:
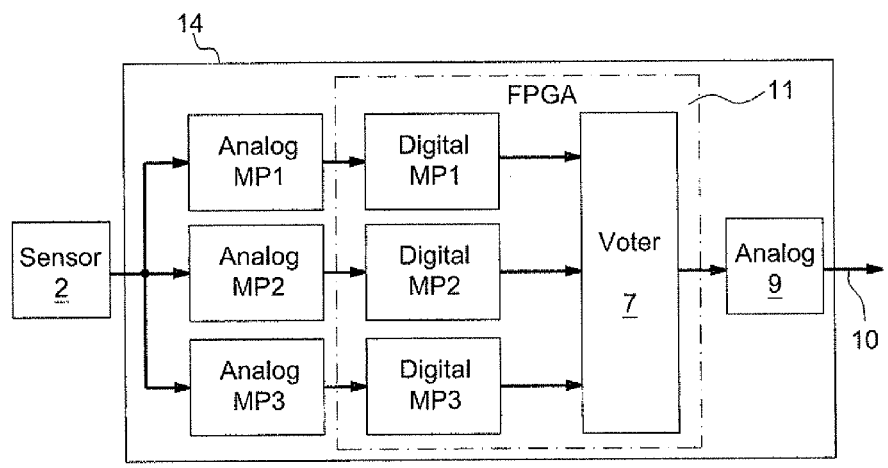
FIG. 4b is a fourth control/evaluation unit of the invention with triple redundance.

In FIGS. 4a and 4b, in each case, a control/evaluation unit 14 with triple redundance is shown. While in the solution shown in FIG. 4A, the triple redundance is executed only for the digital function modules of the control/evaluation unit 14, the triple redundance in the case of the embodiment illustrated in FIG. 4b relates also to the analog, sensor side, function modules.

Figure 5:
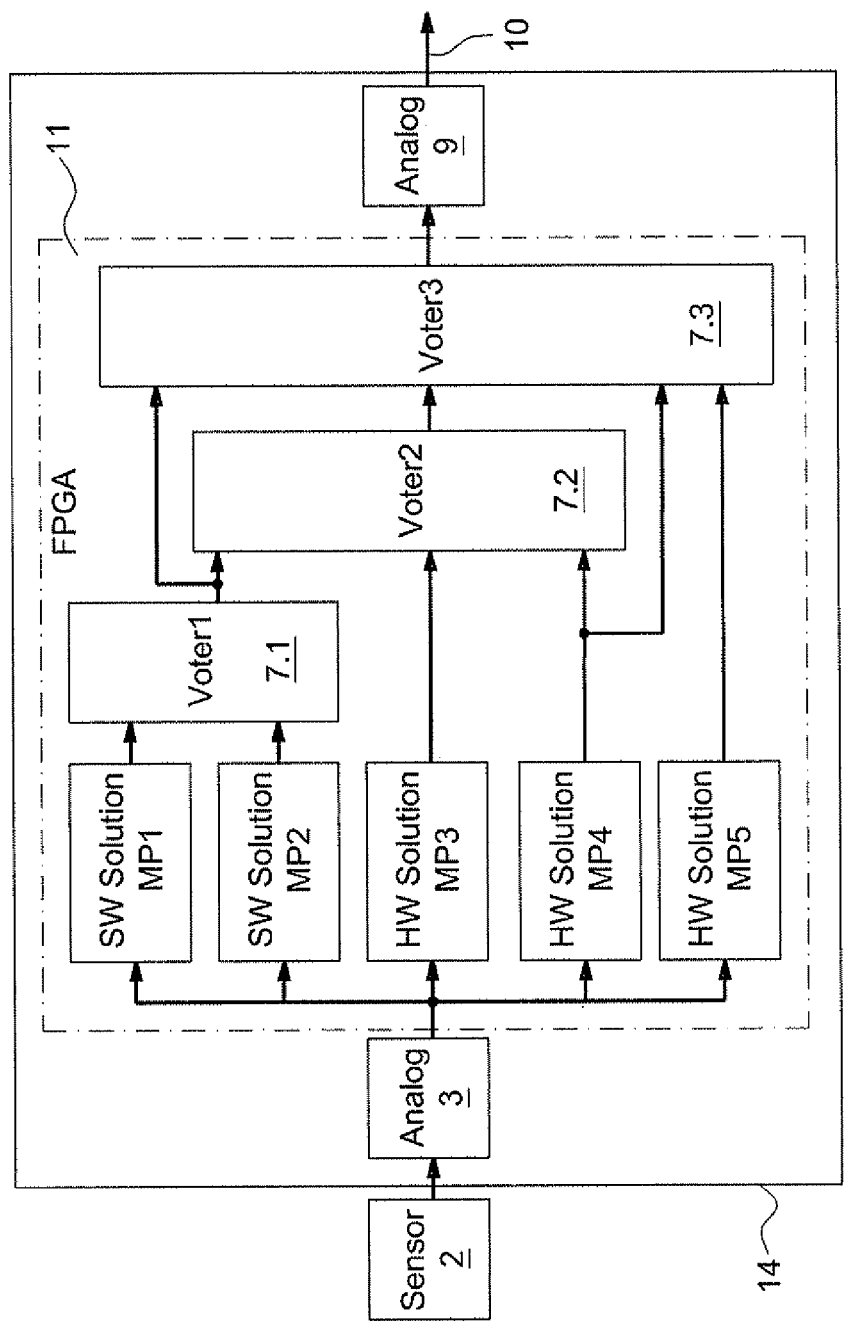
FIG. 5 is a variant of a field device of the invention with five degrees of redundance and/or diversity of the control/evaluation unit.

FIG. 5 shows, for example, a first control/evaluation unit 14 of the invention with triple redundance, which satisfies the highest safety requirements. By way of example, reference is made here to use of a sensor 2 in a high safety area of an atomic power plant. Of course, the complete measuring point, which is composed of the sensor 2 and the control/evaluation unit 14 designed as a redundant, diverse tool chain, can in turn be designed redundantly.

Partially dynamically reconfigured on the FPGA 11 in the first and the second measuring paths MP1, MP2 are the function modules for a digital and software solutions, respectively. Both measuring paths MP1, MP2 are redundantly or diversely embodied. The comparison between the measurement results ascertained in the measuring paths MP1, MP2 occurs in the voter 7.1.

The function modules for an analog or hardware-solution are partially dynamically reconfigured in series or in parallel on the FPGA 11 in the third and fourth measuring paths MP3, MP4. Again, the two measuring paths MP3, MP4 are redundantly or diversely embodied. The comparison between the measurement results ascertained in the measuring paths MP3, MP4 occurs in the voter 7.2. Moreover, the result ascertained by the voter 7.1, is, in each case, compared with the measurement results from the measuring paths MP3, MP4. The voter 7.2 is responsible for this. In this way, a decision can be made in the case a warning, or error, message, concerning in which measuring path the flawed test result has occurred.

In an additional step, the measurement result of the voter 7.1, the measurement result of the voter 7.2 as well as the measurement results from the measuring paths MP4, MP5. are fed to the voter 7.3. Through this cascade voting of the measurement results from the individual measuring paths MP1, MP2, MP3, MP4, MP5, it can be determined, in the event of an error, which of the redundant or diverse measuring paths MP1, MP2, MP3, MP4, MP5 is malfunctioning.

Figure 6:
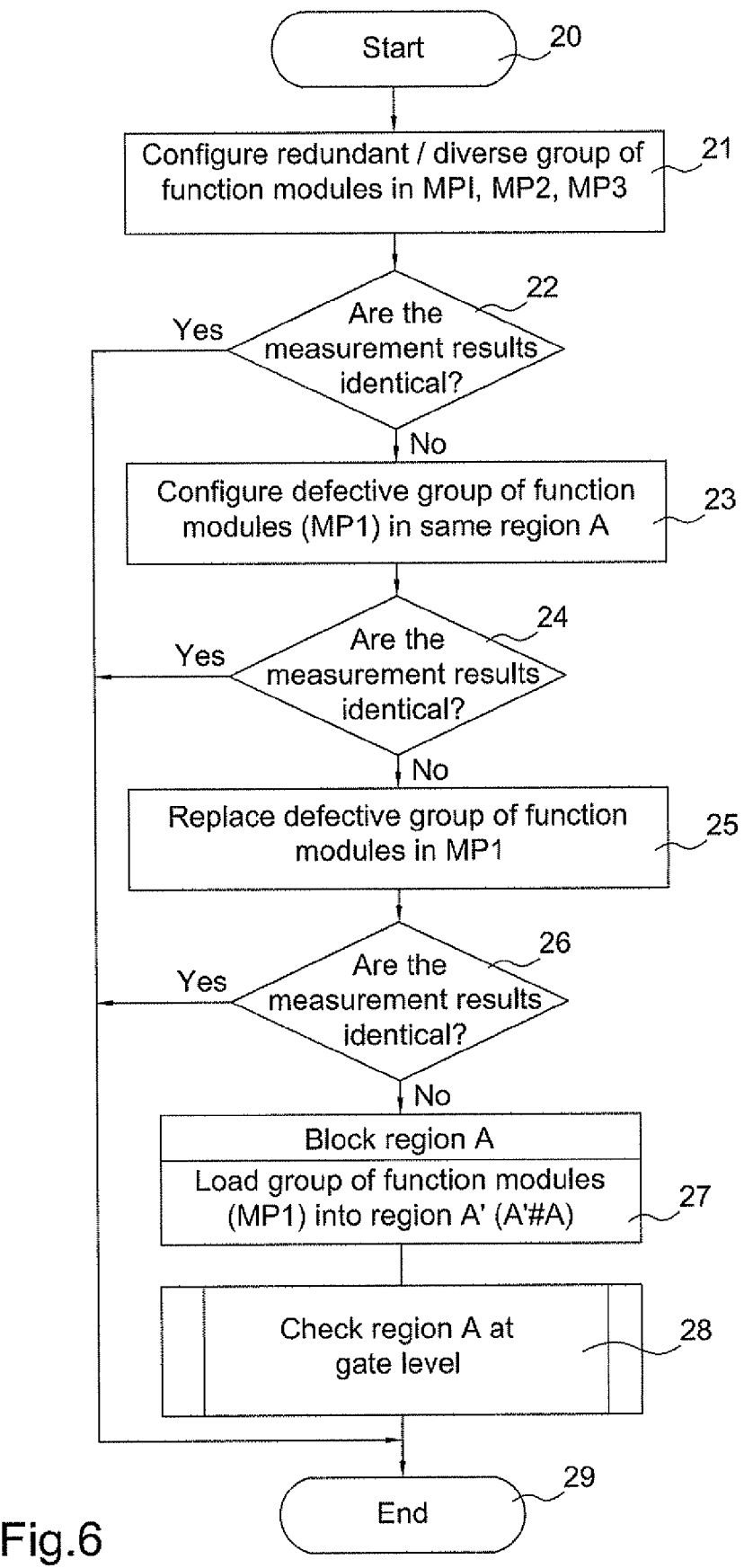
FIG. 6 is a flow diagram of a method for detecting the error source in the case of a control/evaluation unit of the invention.

Now, a variation may be caused by the fact that a group of function modules is malfunctioning or that the corresponding memory area of the FPGA 11 is defective. A method which offers the possibility for a safe distinguishing is sketched on the basis of the flow diagram in FIG. 6. FIG. 6 also shows a triply redundant reconfiguration of the measuring paths MP1, MP2, MP3.

After the system start at program point 20, serially or in parallel, a suitable group of function modules in three measuring paths MP1, MP2, MP3 is partially dynamically reconfigured at program point 21. At program point 22, it is checked whether the measurement results delivered by the three measuring paths MP1, MP2, MP3 are identical, or whether they deviate from one another. The review usually occurs by means of a voter 7. If the measurement results are equal within predetermined tolerance limits, the program jumps to endpoint 29 of the program.

If the voter 22 at program point 22 reports a malfunctioning of one of the three groups of function modules in the measuring paths MP1, MP2, MP3, then the function modules in the measuring path that has been identified as malfunctioning, e.g. the measuring path MP1, are partially dynamically reconfigured again in the same memory range A of the FPGA 11.

If the voter 7 again shows that the measuring path MP1 is malfunctioning, as checked at program point 24, then the malfunctioning group of function modules is reconfigured by a diverse solution in the same memory range A of the partially dynamically reconfigurable FPGA 11. If the voter 7 then delivers the result that the measurement results in the three measuring paths MP1, MP2, MP3 are equal, then the program jumps to the end of the program at 29.

However, if there is still a deviation in the measurement results of the individual measuring paths MP1, MP2, MP3, then this is with high probability an indication that the memory range A of the FPGA is defective. As a countermeasure, at program point 27, the first group of function modules is partially dynamically reconfigured in a new memory range A'; region A is checked at gate level. Additionally, an optional warning message is generated stating that the first group of function modules 3.1, 3.2, 3.3, 6.1, 6.2, 6.3 in the measuring path MP1 should be replaced. Subsequently, the program is ended at point 29.

Figure 7:
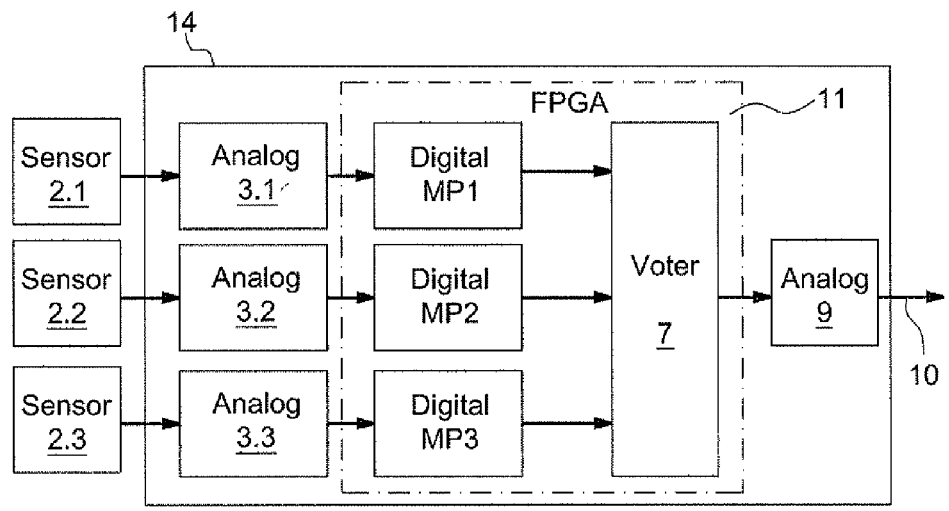
FIG. 7 is an alternative embodiment of the field device of the invention as multisensor.

FIG. 7 shows an alternative embodiment of the field device 1 as a multisensor. In this embodiment, the measuring point is 3-times redundantly and, in given cases, diversely designed.

Figure 8:
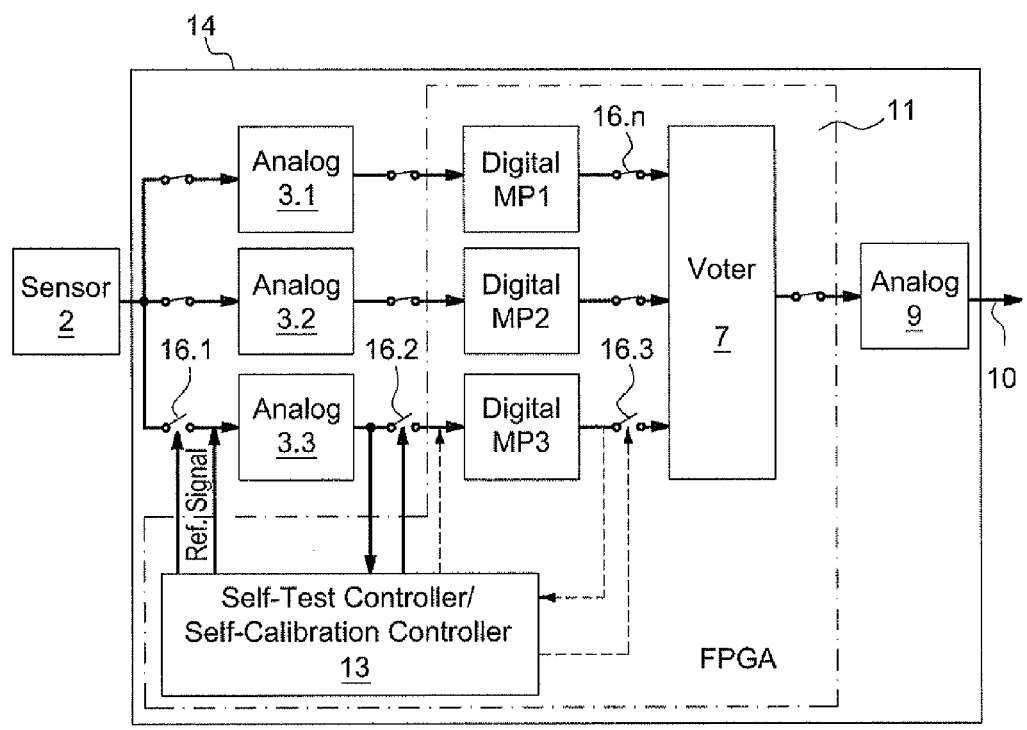
FIG. 8 is a preferred embodiment of the field device of the invention with an option for a review of the functional ability of individual function modules of the control/evaluation unit.

FIG. 8 shows a preferred embodiment of the field device 1 of the invention with an option to review the ability of individual function modules 3.1, 3.2, 3.3, 6.1, 6.2, 6.3 of the control/evaluation unit 14 to function. Via switches 16.1, 16.2, a defined reference signal is applied to the particular function module—here the analog, sensor electronics 3.3. For this, a test microprocessor 13 is preferably reconfigured partially dynamically. However, it can likewise be provided that the test microprocessor 13 is reconfigured in a permanently configured region of the FPGA. The test microprocessor 13 sends a reference signal or a test pattern to a function module 3.3 or alternatively to a group of function modules; by a comparison of the actual response data to the test signal or the test pattern with corresponding, stored, desired response data, the functioning of the function module 3.3 or the functioning of the group of function modules can be checked. The decoupling of function modules 3.1, 3.2, which are to be reviewed, occurs via switches 16.1, 16.2. More information about this method can be found in the previously mentioned DE 10 2006 047 262.4. The content of this patent application as regards the testing of individual function modules 3.2 or groups of function modules is incorporated by reference into the disclosure of the present patent application.

Figure 9:
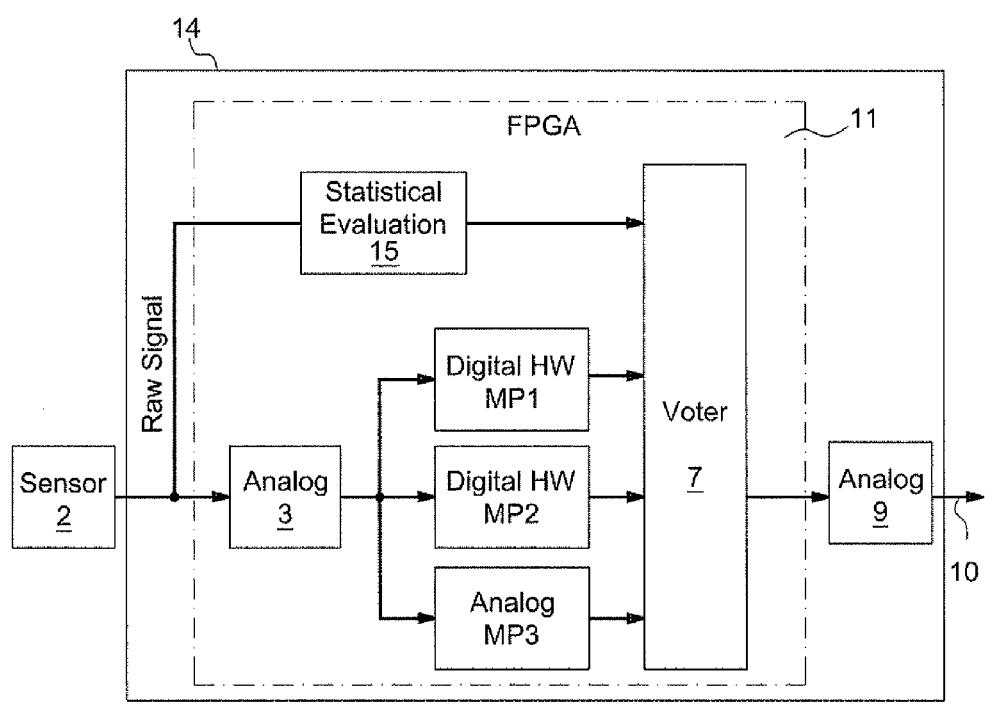
FIG. 9 is an embodiment of the field device of the invention with an option for a review of the functional ability of the sensor.

FIG. 9 shows an embodiment of the field device 1 of the invention, which has an option for reviewing the ability of the sensor 2 to function. Here, supplementally to the measurement results in the three measuring paths MP1, MP2, MP3, the raw signal of the sensor 2, which has been statistically evaluated in the statistical evaluation unit 15, is fed to the voter 7. With this embodiment it can be verified whether, on the one hand, an error occurs in the measuring paths MP1, MP2, MP3 of the control/evaluation unit 14 and, on the other hand, at the sensor 2.

The invention claimed is:

1. A field device for determining or monitoring a process variable in process automation, comprising:
   a sensor, which works according to a defined measuring principle; and
   a control/evaluation unit, which conditions and evaluates measurement data delivered by said sensor along at least three equal valued measuring paths as a function of a safety standard required in a particular safety-critical application, wherein:
   said measuring paths are designed with dynamically reconfigurable function modules diversely;
   said control/evaluation unit is embodied at least partially as a reconfigurable logic chip with a plurality of partially dynamically reconfigurable function modules;
   said control/evaluation unit configures said function modules in said measuring paths as a function of the safety-critical application, that the field device is designed corresponding to the required safety standard;
   said control/evaluation unit partially dynamically, or dynamically, reconfigures said function modules serially or in parallel for an uneven number of diverse measuring paths;
   said control/evaluation unit reconfigures digital hardware based and/or analog hardware based and/or software based, function modules in each of the measuring paths;
   at least one of the measuring paths is provided with at least one analog function module, which is embodied as a dynamically reconfigurable FPAA;
   said control/evaluation unit compares data made available from, by or in the measuring paths with one another; and
   said control/evaluation unit generates a warning report, that a defined measuring path is delivering defective data, when data made available on the defined measuring path deviate from data of the remaining measuring paths.

2. The field device as claimed in claim 1, wherein:
   associated with said control/evaluation unit is a voter, which compares corresponding data that has been made available from, by or in the measuring paths with one another, and, in the case of a deviation, generated a warning, or error, message.

3. The field device as claimed in claim 2, wherein:
said control/evaluation unit partially dynamically reconfigures serially or in parallel said function modules for an uneven number of redundant and/or diverse measuring paths; and
said control/evaluation unit compares the data that has been made available from, by or in the measuring paths with one another; and
said control/evaluation unit generates a warning message that a defined measuring path is delivering defective data, if data is made available on the defined measuring path, which deviates from the data of the remaining measuring paths.

4. The field device as claimed in claim 2, wherein:
a raw measurement signal is supplied supplementally to said voter; and
on the basis of a comparison of actual data of the raw measurement signal with correspondingly stored, desired data, it is ascertained whether said sensor is working correctly or is malfunctioning.

5. The field device as claimed in claim 1, further comprising:
a microcontroller, wherein:
said control/evaluation unit reconfigures said individual function modules or groups of function modules arranged in a measuring path in a defined first region of said logic chip; and
said microcontroller which, through comparison of the data of individual function modules or groups of function modules with corresponding redundant or diverse function modules or groups of function modules, ascertains whether the function module or the group of function modules in the first region of the logic chip is working correctly or is malfunctioning.

6. The field device as claimed in claim 5, wherein:
said control/evaluation unit in the case of an ascertained error newly reconfigures said defective function module or the defective group of function modules in the first region and compares the corresponding data with one another.

7. The field device as claimed in claim 6, wherein:
said control/evaluation unit, in the case of renewed occurrence of an error, loads a diverse function module or a group of diverse function modules into the first region of said logic chip.

8. The field device as claimed in claim 7, wherein:
said control/evaluation unit, if there is a repeated occurrence of an error, blocks the first region of said logic chip, and reconfigures the corresponding function module, or the corresponding group of function modules, in a second region of said logic chip, which differs from said first region of said logic chip, and compares the corresponding data with one another.

9. The field device as claimed in claim 8, wherein:
said control/evaluation unit, if there is a repeated occurrence of an error, issues a message that said function module or the group of function modules is malfunctioning; and
said control/evaluation unit reconfigures a redundant and/or diverse function block in the second region.

10. The field device as claimed in claim 1, wherein:
said control/evaluation unit reconfigures hardware, and/or software, based function modules in each of the measuring paths.

11. The field device as claimed in claim 1, further comprising:
an analog sensor circuit is associated with said sensor for outputting a raw measurement signal representing the process variable that is to be ascertained or monitored; and
said subsequent control/evaluation unit has function modules as follows:
an analog/digital converter, which converts the analog, raw measurement signal into a digital, raw measurement signal, a processing unit, which serves for redundant and/or diverse evaluation of the digital, raw measurement signal, and
a communication circuit, which serves for forwarding the evaluated measurement signal to a superordinated control unit.

12. The field device as claimed in claim 1, further comprising:
a test microprocessor, which sends a test signal or a test pattern to a function module or to a group of function modules, and, wherein:
by a comparison of actual response data to the test signal or the test pattern with corresponding, stored, desired response data, checks the functioning of the function module or the functioning of the group of function modules.

13. The field device as claimed in claim 1, wherein:
a static region, at least one function module is permanently configured, in which a control program for configuring the function modules runs.

14. The field device as claimed in claim 1, wherein:
said logic chip is a dynamically partially reconfigurable FPGA.

15. The field device as claimed in claim 1, wherein:
said logic chip has a plurality of logic cells in a fixedly wired FPGA/standard ASIC structure, wherein the logic cells are so configurable by means of configuration registers, that they execute elementary logic functions;
a connection matrix with a plurality of memory cells is provided, via which different logical connections of the logic cells are configurable in defined complex connections by means of the configuration register; and
a second control unit is provided, which partially dynamically so configures said logic cells and the connection matrix via an internal bus and via the configuration register by means of a configuration-bit stream, that the fixedly wired FPGA/ASIC structure behaves functionally as a partially dynamically reconfigurable, standard logic chip.

* * * * *